(12) United States Patent
Burkart et al.

(10) Patent No.: US 11,661,827 B2
(45) Date of Patent: May 30, 2023

(54) GAS LIFT VALVE AGING PROCESS AND APPARATUS

(71) Applicant: PCS Ferguson, Inc., Frederick, CO (US)

(72) Inventors: Victoria Paige Burkart, Westminster, CO (US); Dustin Sandidge, DeBeque, CO (US); Paul Treavor Roberts, Longmont, CO (US)

(73) Assignee: PCS Ferguson, Inc., Crowley, TX (US)

( * ) Notice: Subject to any disclaimer, the term of this patent is extended or adjusted under 35 U.S.C. 154(b) by 202 days.

(21) Appl. No.: 17/156,765

(22) Filed: Jan. 25, 2021

(65) Prior Publication Data

US 2021/0246769 A1 Aug. 12, 2021

Related U.S. Application Data

(60) Provisional application No. 62/975,274, filed on Feb. 12, 2020.

(51) Int. Cl.
*E21B 43/12* (2006.01)
*G01M 3/02* (2006.01)
*G01M 3/28* (2006.01)

(52) U.S. Cl.
CPC ............ *E21B 43/123* (2013.01); *G01M 3/02* (2013.01); *G01M 3/2876* (2013.01); *E21B 2200/02* (2020.05)

(58) Field of Classification Search
CPC .... G01M 3/3281; G01M 3/3263; G01M 3/02; G01M 3/22; G01M 3/224
See application file for complete search history.

(56) References Cited

U.S. PATENT DOCUMENTS

| | | | |
|---|---|---|---|
| 1,926,030 A | 9/1933 | Boynton | |
| 2,680,408 A | 6/1954 | Davis | |
| 3,059,700 A | 10/1962 | Loy, III et al. | |
| 3,185,219 A | 5/1965 | Grimmer | |
| 3,799,259 A | 3/1974 | Dinning | |
| 6,276,458 B1 * | 8/2001 | Malone | E21B 21/10 166/240 |
| 6,591,201 B1 * | 7/2003 | Hyde | G01F 25/10 700/282 |
| 7,640,980 B2 * | 1/2010 | Vinegar | E21B 36/02 405/52 |
| 7,703,536 B2 * | 4/2010 | Vann | E21B 34/08 166/321 |
| 9,116,082 B1 * | 8/2015 | Haywood | G01N 1/2035 |
| 9,151,690 B2 * | 10/2015 | Cook | G01M 3/04 |
| 9,915,582 B2 * | 3/2018 | Garber | E21B 41/00 |

(Continued)

*Primary Examiner* — David A. Rogers
(74) *Attorney, Agent, or Firm* — Snell & Wilmer L.L.P.; Howard I. Sobelman

(57) ABSTRACT

A process for aging gas lift valves utilizing a controlled decompression to prevent damage to seals of the gas lift valves. The process includes pressuring one or more gas lift valves to a predetermined pressure (e.g., 5000 psig) and maintaining this pressure for a predetermined time (e.g. five minutes). After this time period, decompression is performed in discrete steps. For instance, the pressure of the pressure vessel may be reduced in predetermined pressure increments (i.e. reductions). After each pressure reduction, the reduced pressure is maintained for a predetermined time. This allows gasses and fluids within the elastomeric O-rings time to dissipate without causing damage to the seals.

20 Claims, 8 Drawing Sheets

(56) References Cited

U.S. PATENT DOCUMENTS

| | | | |
|---|---|---|---|
| 10,655,439 B2 * | 5/2020 | Murdoch | E21B 43/123 |
| 10,920,905 B2 * | 2/2021 | Garner | F16K 11/07 |
| 2005/0061369 A1 | 3/2005 | De Almeida | |
| 2013/0306167 A1 * | 11/2013 | Sisk | F16K 27/0209 |
| | | | 137/540.11 |
| 2015/0359633 A1 * | 12/2015 | Dingmann | A61F 2/2472 |
| | | | 73/865.6 |

* cited by examiner

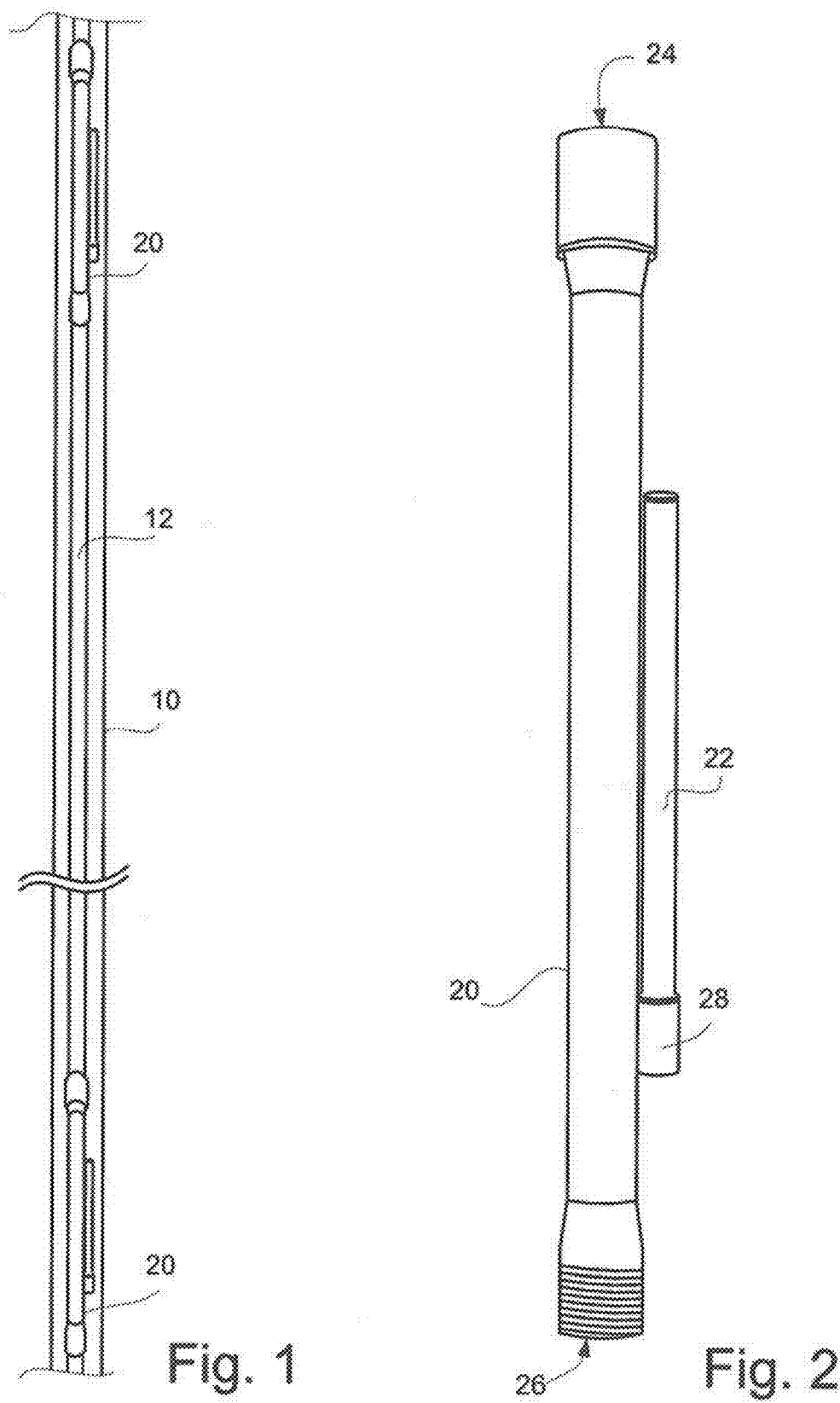

GAS LIFT VALVE AGING PROCESS AND APPARATUS

CROSS REFERENCE

The present application claims the benefit of the filing date of U.S. Provisional Application No. 62/975,274 having filing date of Feb. 12, 2020, the entire contents of which is incorporated herein by reference.

FIELD

The present disclosure relates to gas lift systems that inject gas into production tubing of hydrocarbon production wells. More specifically, present discourse relates to a system and process for testing gas lift valves prior to downhole use.

BACKGROUND

Well bores of oil and gas wells extend from the surface to permeable subterranean formations ('reservoirs') containing hydrocarbons. These well bores are drilled in the ground to a desired depth and may include horizontal sections as well as vertical sections. In any arrangement, piping (e.g., steel), known as casing, is inserted into the well bore. The casing may have differing diameters at different intervals within the well bore and these various intervals of casing may be cemented in-place. Other portions (e.g., within producing formations) may not be cemented in place and/or include perforations to allow hydrocarbons to enter into the casing. Alternatively, the casing may not extend into the production formation (e.g., open-hole completion).

Disposed within a well casing is a string of production piping/tubing, which has a diameter that is less than the diameter of the well casing. The production tubing may be secured within the well casing via one or more packers, which may provide a seal between the outside of the production piping and the inside of the well casing. The production tubing provides a continuous bore from the production zone to the wellhead through which oil and gas can be produced.

The flow of fluids, from the reservoir(s) to the surface, may be facilitated by the accumulated energy within the reservoir itself, that is, without reliance on an external energy source. In such an arrangement, the well is said to be flowing naturally. When an external source of energy is required to flow fluids to the surface the well is said to produce by a means of artificial lift. Generally, this is achieved by the use of a mechanical device inside the well (e.g., pump) or by decreasing the weight of the hydrostatic column in the production tubing by injecting gas into the liquid some distance down the well.

The injection of gas to decrease the weight of a hydrostatic column is commonly referred to as gas lift, which is artificial lift technique where bubbles of compressed air/gas are injected to reduce the hydrostatic pressure within the production tubing to below a pressure at the inlet of the production tubing. In one gas lift arrangement, high pressure gas is injected into the annular space between the well casing and the production tubing. At one or more predetermined locations along the length of the production tubing, gas lift valves permit the gas in the annular space to enter into the production tubing.

The gas lift valves control the flow of pressurized gas from the well casing through a valve port into an interior of the production tubing. Tubing and casing pressures cause the gas-lift valves to open and close, thus allowing gas to be injected into the production tubing and thereby causing fluid in the tubing to rise to the surface. Further, different valves may have different pressure settings.

SUMMARY

When utilizing gas lift, it is desirable to test the gas lift valves prior to their insertion in a string of production tubing. Such testing is sometimes referred to as aging. During this process, the valves are disposed in a pressure vessel that pressurizes and depressurizes the gas lift valves to, among other things, flex the bellows. The inventors have recognized that rapid decompression during this process can damage various seals in the gas lift valves and in some instances the bellows of such valves.

According to one aspect, a process is provided for aging gas lift valves utilizing a controlled decompression to prevent damage to seals of the gas lift valves. The process includes pressuring one or more gas lift valves to a predetermined pressure (e.g., 5000 psig) and maintaining this pressure for a predetermined time (e.g. five minutes). After this time period, decompression is performed in discrete steps. For instance, the pressure of the pressure vessel may be reduced in predetermined pressure increments (i.e. reductions). After each pressure reduction, the reduced pressure is maintained for a predetermined time. This allows gasses and fluids within the elastomeric O-rings time to dissipate without causing damage to the seals. The pressure reduction increments may be selected based on the material(s) forming the seals of the gas lift valve. The stepwise reduction may continue until a minimum pressure is achieved. At this time the cycle may start over.

According to another aspect, a system is provided for aging gas lift valves. The system includes a pressure vessel configured to hold one or more gas lift valves. A pump pressurizes the vessel with fluid (e.g., water). A pressure transducer monitors the pressure in the vessel and outputs an indication of the pressure to a controller. The controller is configured to operate the pump and an inlet valve into the tank. Once a desired pressure is achieved, the inlet valve is closed. To permit controlled decompression of the vessel, at least two valves are connected in-line to an outlet of the tank. The first valve (e.g., throttling valve) throttles the flow out of the tank. The second valve (e.g., needle valve) opens and closes to release fluid from the tank thereby reducing pressure within the tank. At least the second downstream valve is controlled by the controller to reduce the pressure in the vessel as monitored by the pressure transducer. The controller controls one or both of the downstream valves to incrementally reduce the pressure in a series of pressure reduction steps that are each maintained for a predetermined time. The controller may include a memory for storing seal information, which may be indexed to predetermined pressure reduction steps and/or time increments.

BRIEF DESCRIPTION OF THE DRAWINGS

FIG. 1 is a schematic illustration of a production tubing is disposed within a casing of an oil and gas well.

FIG. 2 illustrates a gas lift mandrel and gas lift valve.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

The following disclosure is directed to a system and process for 'aging' gas lift valves prior to their use in a downhole application. As discussed herein, such valves typically include an internal bellows that, in response to pressure in an annulus of a production well, either contracts to open the valve and inject gas from the annulus into production tubing or expands to close the valve to prevent injection of the gas into the production tubing. Such bellows are typically constructed of a thin metal sheet folded into a series of corrugations. To ensure that the valve operates properly once inserted into a production string, the valves are typically tested prior to use. Such testing or 'aging' repeatedly deflects (e.g., compresses and expands) the bellows prior to actual use such that the bellows will respond consistently to known pressures. That is, the force (i.e., pressure) required to compress the bellows a first time may be different than subsequent pressures required to compress the bellows. Stated otherwise, after several compression cycles, the bellows achieves an equilibrium where the bellows responds in the same way to the same pressure. Aspects of the presented application are based on the recognition by the inventor(s) that the aging process can damage seals within the valve and, in some instances the bellows. Further, such damage may not be evident during inspecting after aging. Accordingly, a system and process is provided for aging gas lift valves that reduces or eliminates damage to the seals of a gas lift valve and/or the bellows of the gas lift valve.

Figure 3:
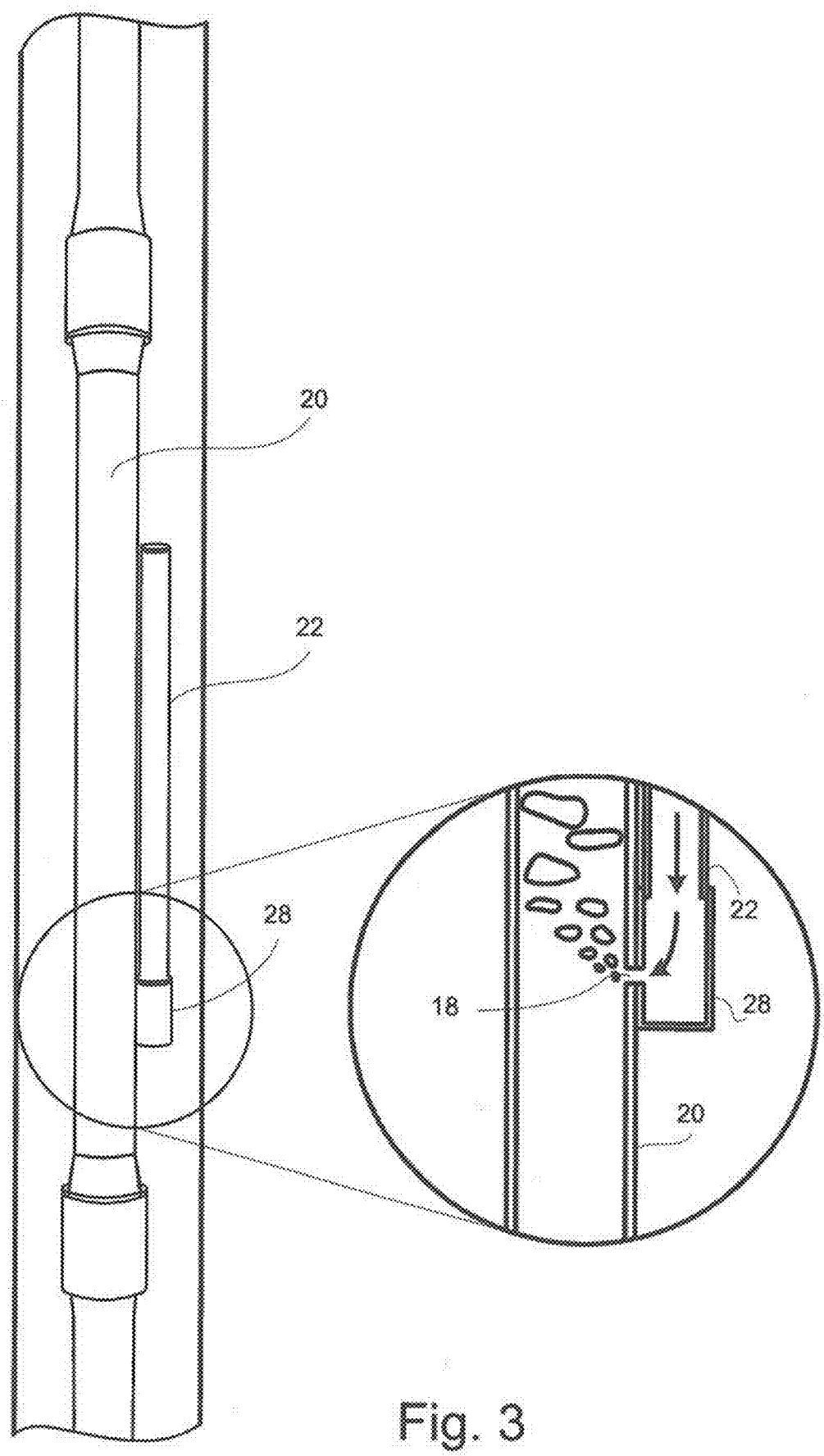
FIG. 3 is a schematic illustration of injection of gas into a production tubing.

FIG. 1 is a schematic illustration of an exemplary installation of an embodiment of a gas lift arrangement. As illustrated, an exemplary string of production tubing 12 is disposed within a casing 10 of an oil and gas well. In the illustrated embodiment, one or more mandrels 20 are disposed along the production string 12 at predetermined subterranean locations. Each of the mandrels 20 supports a gas lift valve 22, which is operative to open and close based on pre-set pressure settings. As shown in FIG. 2, each mandrel 20 is tubular member having first and second open-ends 24, 26 that are adapted for in-line connection with the production tubing 12. In this regard, one or both ends may be threaded and/or include a collar. The mandrel 20 further includes a lug 28 on its outside surface that supports the gas lift valve 22. The lug includes one or more internal valve ports/bleed ports 18 that communicate with the interior of the mandrel. See FIG. 3. The gas lift valve 22 may be any appropriately configured gas lift valve. Typically, such gas lift valves include internally pressurized bellows that allow the valve to open and close based on predetermined pressure changes. For instance, such valves may normally be closed and only open after a gas lift pressure overcomes a downward force of the charged bellows. Exemplary valves that may be utilized are available from PCS Ferguson, Inc. of 3771 Eureka Way, Frederick, Colo. 80516.

In operation, a high-pressure source of gas (not shown) is injected down through the well casing in the annulus between the well-casing 10 and the production tubing 12. The gas lift valves 22 supported by each mandrel 20 opens as the injection gas displaces fluid from the annulus. As these valves open, the opened valve injects gas from the annulus into production tubing 12 via valve port(s) 18 in the mandrel 20. See FIG. 3. In some arrangements, upper gas valves may close after lower gas valves open. In any arrangement, as the injected gas flows to the surfaces it expands thereby lifting the liquid within the production tubing and reducing the density and column weight of the fluid in the tubing.

Figure 4:
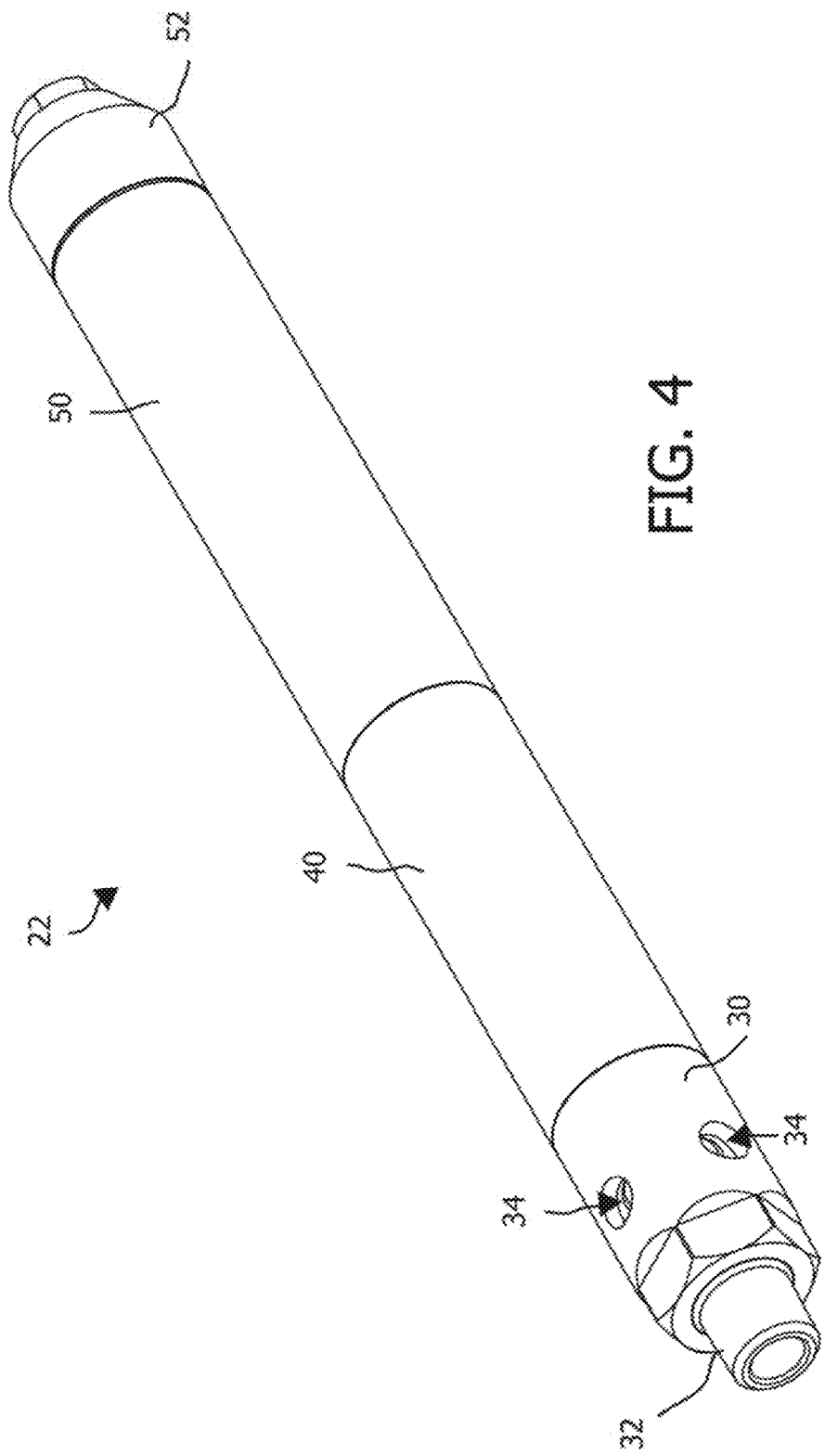
FIG. 4 illustrates a perspective view of a gas lift valve.
Figure 5:
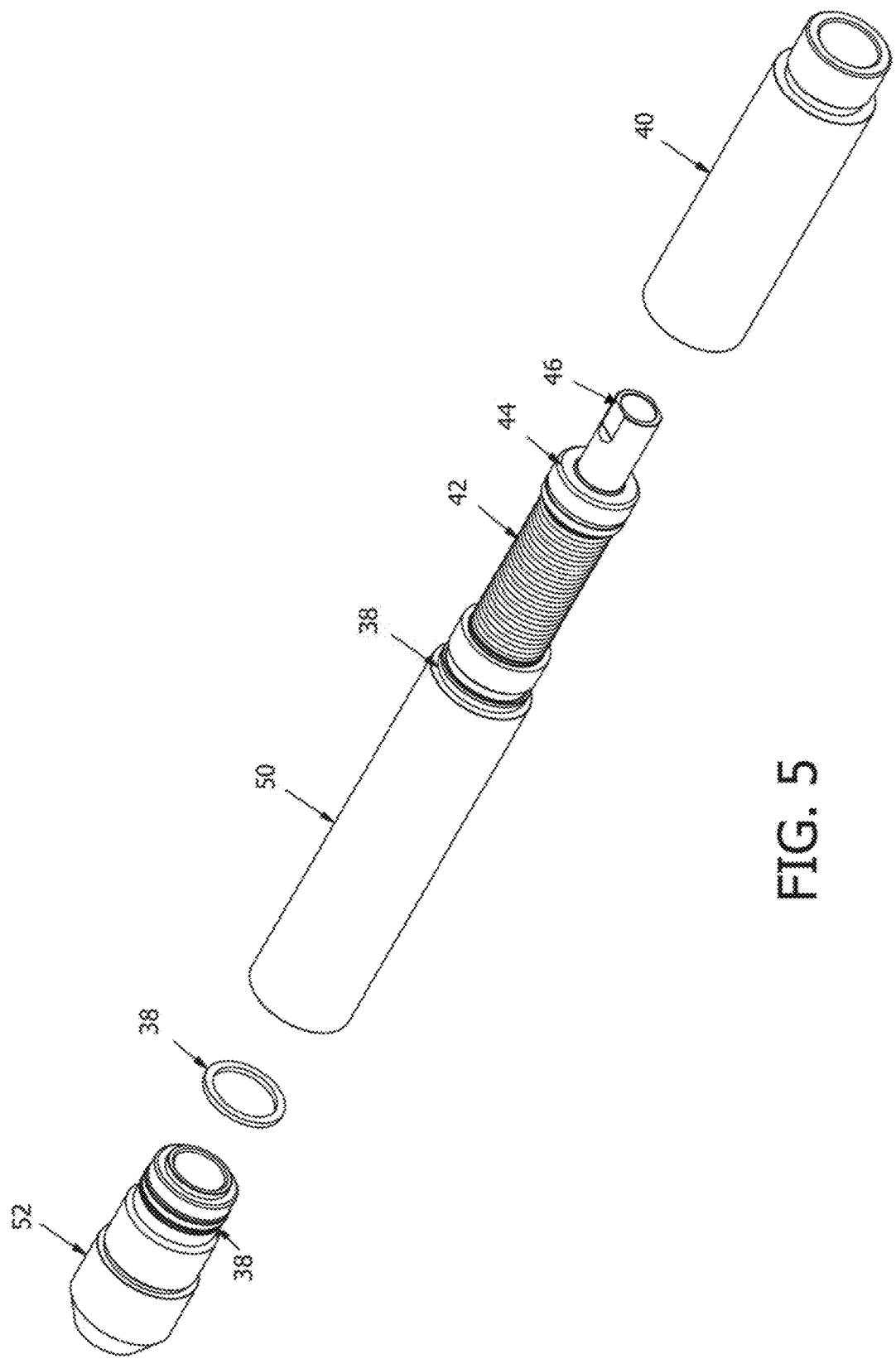
FIG. 5 illustrates a partial exploded view of the gas lift valve.

FIGS. 4 and 5 illustrate one non-limiting embodiment of a gas lift valve 22. Generally, the gas lift valve 22 includes three separate chambers or housings. Specifically, the gas lift valve 22 includes a seat housing 30, a bellows housing 40 and a pressurized gas housing 50. The seat housing 30 has a nipple 32 on it lower end configured to engage the lug of the mandrel or other production tubing interface. The seat housing 30 also includes a plurality of external ports 34 that permit pressurized gas from the annulus of the production well to communicate with the interior of the gas lift valve 22. The bellows housing 40 threadably connects to an upper end of the seat housing 30. The bellows housing encloses a bellows 42 that opens and closes the valve in response to gas pressure in the well casing as communicated through the ports 34 of the seat housing. The pressurized gas housing 50 threadably connects to an upper end of the bellows housing 40. An end cap 52 threadably attaches to the upper end of the pressurized gas housing 50. Various seals 38 (e.g., O-rings, crush gaskets, etc.) are disposed between the threadedly connected housings and end cap.

Figure 6:
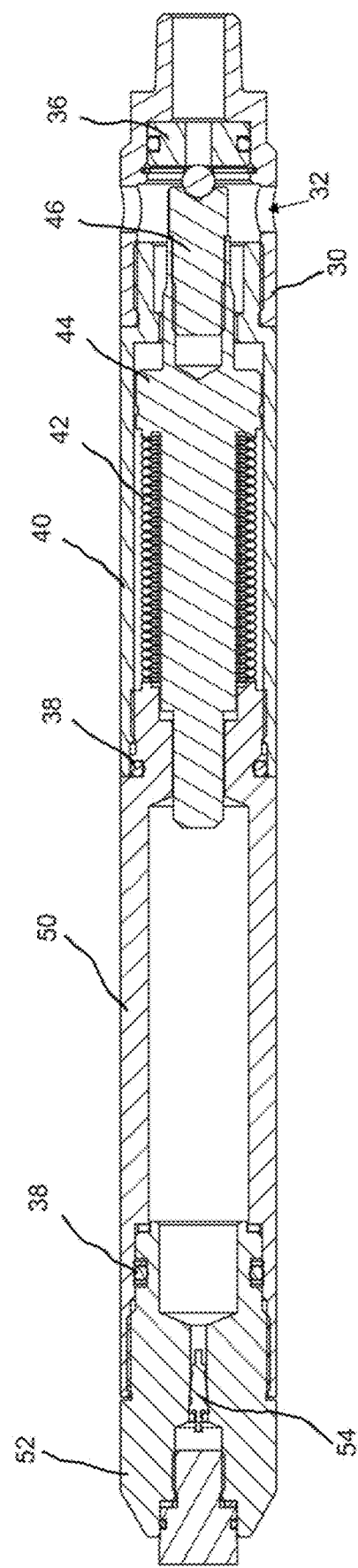
FIG. 6 illustrates a cross-sectional view of the gas lift valve.

FIG. 6 illustrates a cross-sectional diagram of the valve 22. As shown, an upper peripheral end of the bellows 42 attaches to a lower peripheral end of the pressurized gas housing 50. See also FIG. 5. A peripheral forward end of the bellows 42 attaches to a bellows adapter 44. The bellows adapter 44 extends through a hollow interior of the bellows and into an interior chamber of the pressurized gas housing 50. Accordingly, pressurized gas within the housing may interact with the adapter to expand the bellows 42. A forward end of the adapter 44 engages a valve stem 46 that is disposed within the seat housing 30. The valve stem 46 may engage a valve seat 36.

The pressurized housing/gas chamber 50, when attached to the bellows housing 40 and the end cap 52, defines an enclosed interior chamber that may be pressurized (i.e., charged) utilizing, for example, an inert gas such as nitrogen. More specifically, gas may be injected into the pressurized housing chamber via valve core 54 until a desired pressure charge is achieved within the chamber 50. The pressurized gas in the gas chamber 50 expands the bellows forward forcing the stem 46 against the valve seat 36 and thereby closing the gas lift valve 22. However, when pressurized gas is present in the annulus of a production well, pressurized gas enters the seat housing 30 through the ports 34. This pressurized gas communicates with the forward end of the bellows adapter 44. If a force provided by the annulus gas on the forward end of the bellows adapter 44 is greater than a force provided on the rearward end of the bellows adapter 44 by the pressurized gas in gas chamber 50, the bellows 42 compresses permitting the valve stem 46 to move away from the valve seat 36. That is, the gas lift valve 22 opens when the annulus pressure is greater than the counteracting pressure provided from the pressurized gas in the gas chamber 50. This allows gas from the annulus to pass through the seat housing nipple 32 and into the production tubing.

As noted above, it is desirable to test gas injection valves prior to their use in down hole applications. That is, gas injection valves typically undergo an aging process where the gas lift valves are charged (e.g., to a desired opening pressure) and the bellows are repeatedly compressed and expanded. This allows the bellows to achieve an equilibrium such that it responds consistently to applied pressures. After undergoing an aging process, the opening pressure of the gas lift valve may be tested and, if necessary, the charge pressure may be adjusted, and/or the aging process may be repeated. Alternatively, the valve may be determined to be defective. A similar testing process may be used for testing gas lift valves that do not include bellows (e.g., electrically actuated gas lift valves). Most commonly, such aging entails placing one or more gas lift valves in a pressure vessel (e.g., water tank). The pressure vessel is pressurized to a set pressure (e.g., 5000 psig) for a predetermined time (e.g., five minutes). The pressure is released, and the process is repeated a predetermined number of times.

Figure 7:
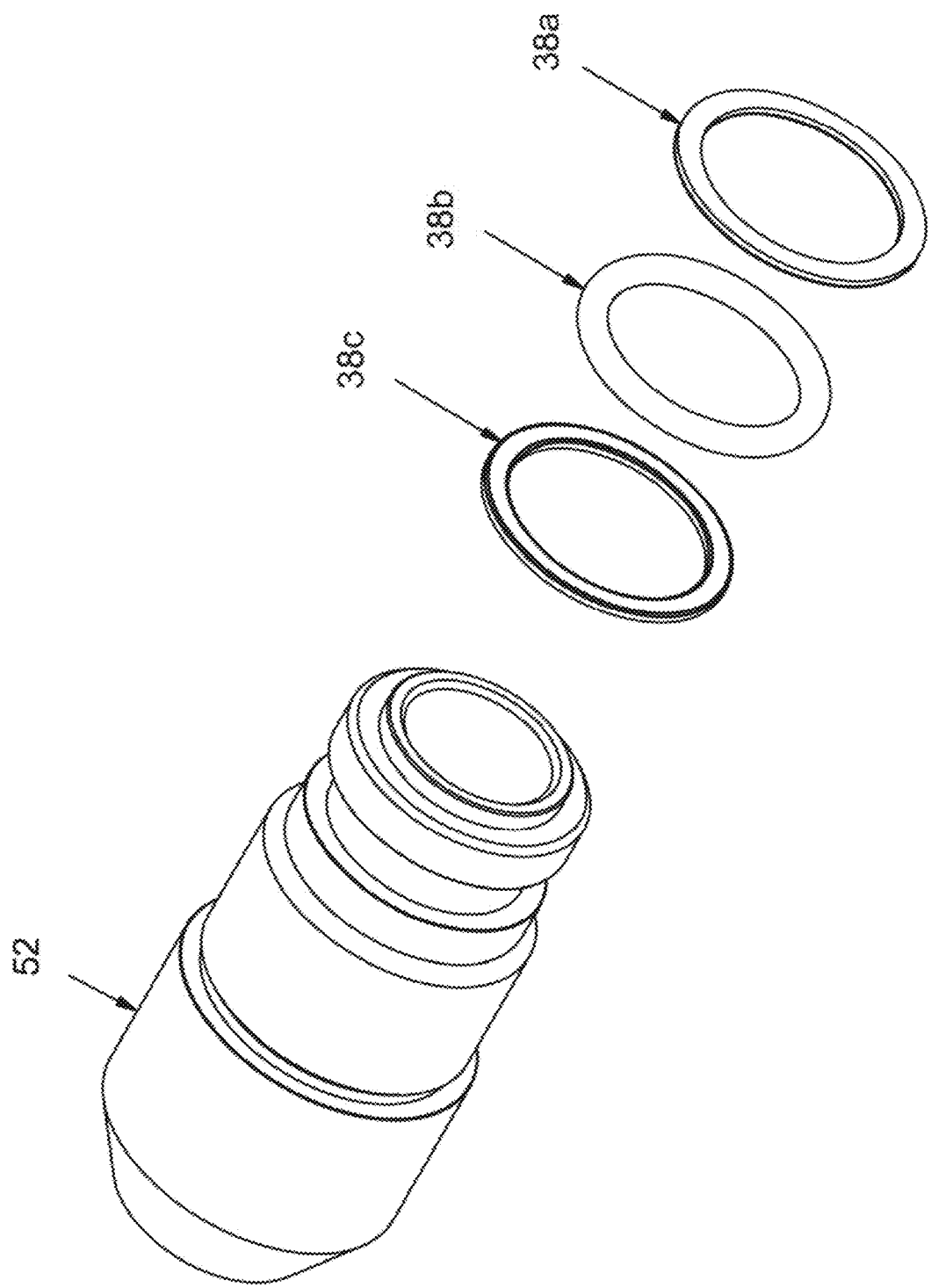
FIG. 7 illustrates sealing elements of the gas lift valve.

As noted above, the various components of a gas lift valve are often threadably connected and utilize various O-rings and/or crush gaskets between the components to maintain the pressurized charge in the gas chamber 50. FIG. 7 illustrates an upper or rearward portion of a gas lift valve showing the end cap 52 that engages the upper end of the gas chamber. In the illustrated embodiment, three sealing elements are provided to seal the connection between the end cap 52 and the gas chamber (not shown). Specifically, the sealing elements include an elastomeric O-ring 38b (e.g., Aflas®) and two back-up O-rings 38a, 38c (e.g., Viton®). The inventors have recognized that these rearward sealing elements tend to be the most common point of failure in at least some gas lift valves. More specifically, the inventors have recognized that the elastomeric sealing elements tend to be the most common point of failure after a gas injection valve is placed in use (e.g., downhole). As will be appreciated, such failure requires that an entire production string be pulled from a well and, most commonly, replacing all the gas lift valves.

Importantly, the inventors have recognized that the failure of the elastomeric seals and/or the bellows of a gas lift valve is sometimes tied to the aging process. In the former regard, the elastomeric seals exhibit a level of permeability under the intense pressure (e.g., 5000 psig) of the aging process. Stated otherwise, under intense pressure in the pressure vessel used in the aging process, some amount of fluid and gasses within the pressure vessel fluid (e.g., water) infiltrates into the elastomeric O-rings. If the pressure chamber is rapidly decompressed, the fluids are expelled from the elastomeric O-rings and/or increase in volume due to dropping pressure (e.g., in a process similar to outgassing). The expulsion of the fluids from the elastomeric O-rings and/or expansion of the fluids can damage internal structure of the O-rings. Such damage can cause immediate failure (e.g., decompression of the gas chamber). However, such damage may not result in immediate failure. The O-ring may be damaged but initially holds pressure. In such instances, a gas lift valve may pass testing with a compromised sealing element. Such a gas lift valve may fail prematurely in use. Likewise, rapid decompression can also damage the bellows.

To counter the effects of fluids exiting the elastomeric O-rings and/or bellows during decompression, the presented system and method utilizes controlled decompression with the aging process. As noted, the aging process typically entails pressurizing gas lift valves in a pressure vessel to an elevated pressure (e.g., 5000 psig) and holding this pressure for a predetermined time (e.g., five minutes). The pressure vessel is then depressurized. Such depressurization is typically performed manually by opening a valve resulting in rapid decompression occurring, for example, ten to fifteen seconds. To allow the gasses and/or liquids compressed into the elastomeric O-rings to exit without causing damage and/or to prevent bellows damage during rapid decompression, the decompression is performed in discrete steps. For instance, the pressure of the pressure vessel may be reduced in predetermined pressure increments. After each pressure reduction, the reduced pressure is maintained for a predetermined time. This allows gasses and fluids within the elastomeric O-rings time to dissipate without causing damage.

Figure 8:
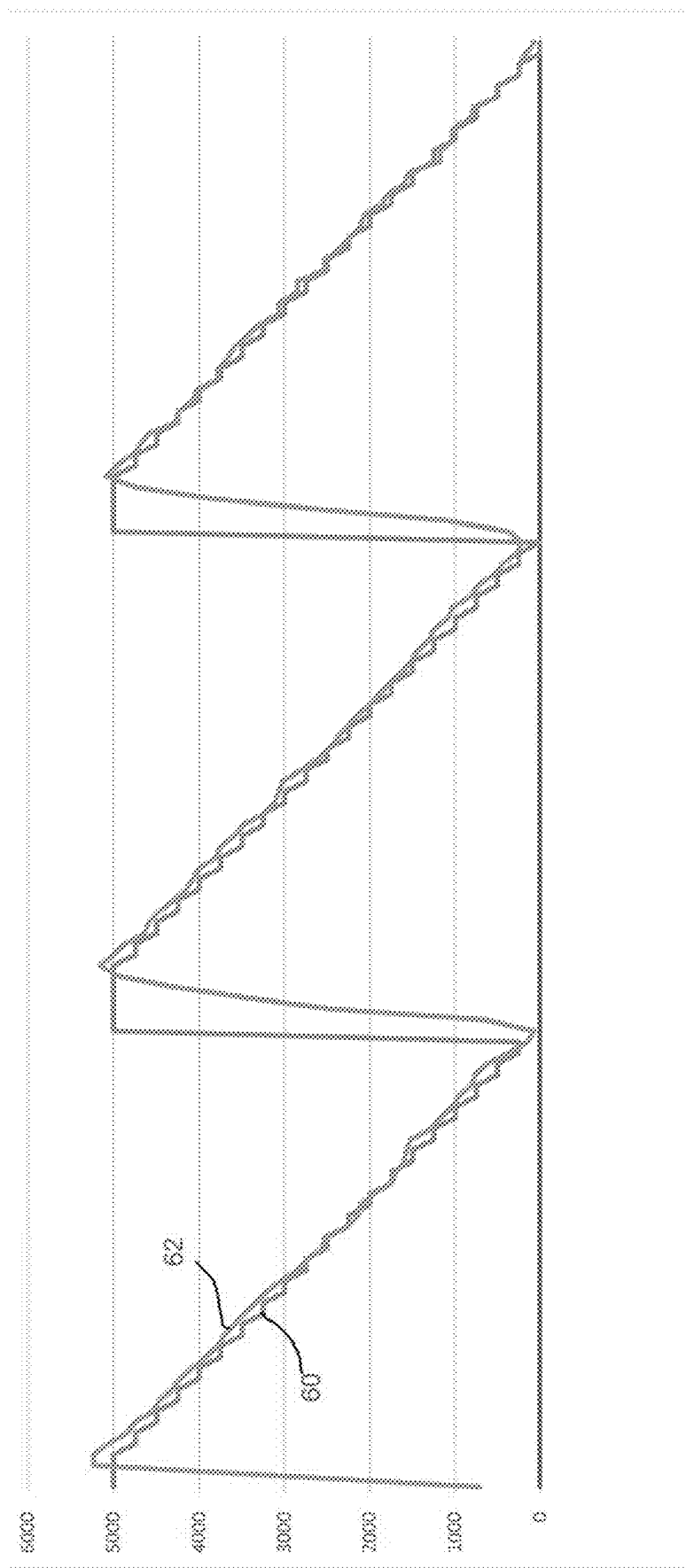
FIG. 8 illustrates a decompression process for aging a gas lift valve.

FIG. 8 illustrates one embodiment of an aging process with controlled decompression. As illustrated, the pressure within a pressure vessel housing one or more gas lift valves is initially set to a 5000 psig set point 60 or slightly above as shown by the gauge line 62. The pressure is held at this pressure set point for five minutes. The pressure set point 60 is then reduced 250 psig. This reduced set point (e.g., 4750 psig) is then held for a predetermined time period, which in this case is 30 seconds. The set point is then reduced another 250 psig and held for another 30 second time period. This is repeated until the pressure is reduced to or near atmospheric pressure. (e.g., 20 steps). As further illustrated, this process may be repeated multiple times. In effect, the process results in a decompression rate of 500 psig per minute.

Notably, the decompression rate required to prevent damage may be dependent on the material forming the O-ring. That is, some materials will require different pressure reductions '$\Delta P$' (e.g., 125-500 psig) and/or different time periods '$\Delta t$' (e.g., 15-90 seconds). Such information may be tabulated and stored to a database for use by a controller in an automated process. In such an arrangement, a user may input the material or material of the O-rings (or other seals) into the controller. The controller may then select the decompression rate (e.g., pressure steps and/or time steps).

One difficulty in performing the controlled decompression is controlling the incremental decompression. As will be appreciated, pressure vessels utilized for aging tend to be filled with water. As water is substantially incompressible, very small volumes of water must be removed from the pressure vessel to controllable reduce the internal pressure of the vessel.

Figure 9:
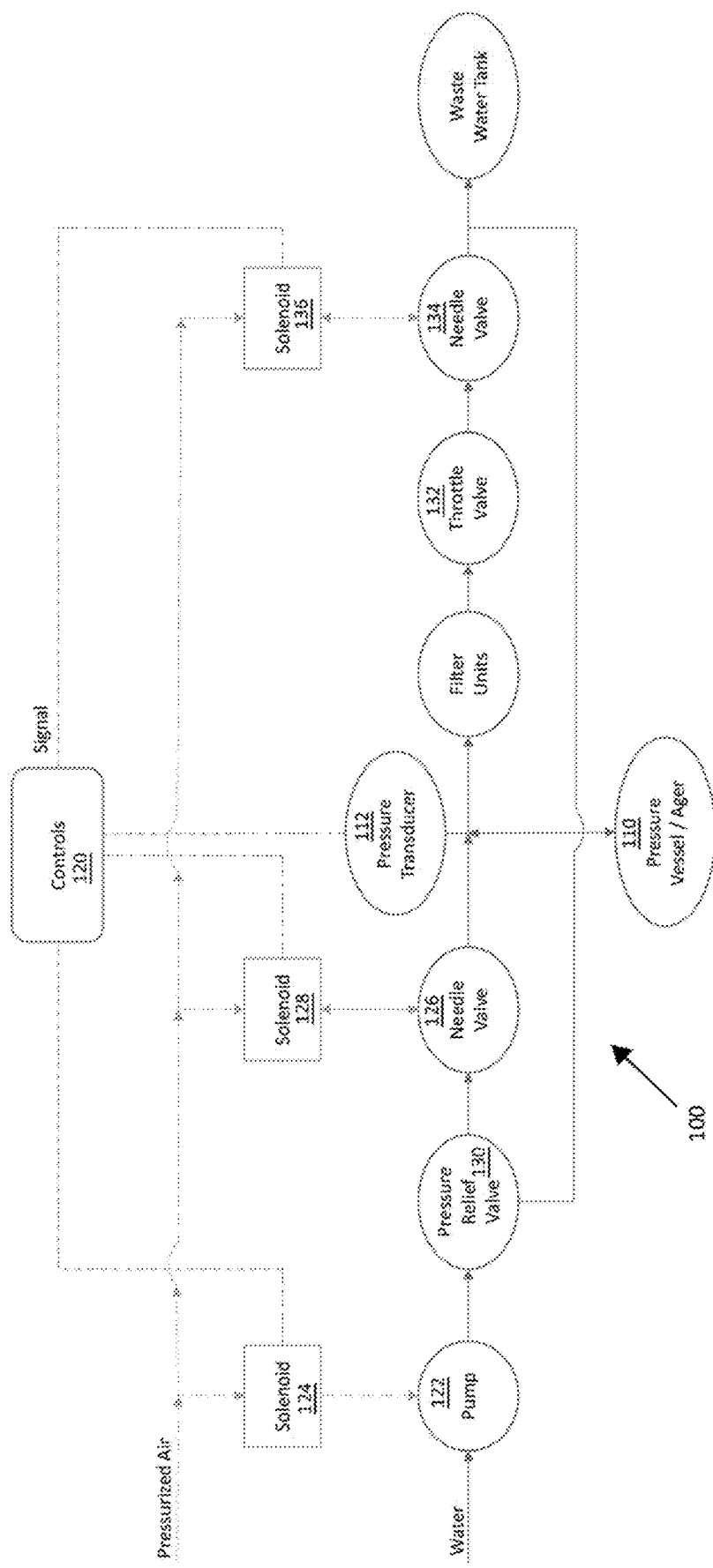
FIG. 9 illustrates a system for aging a gas lift valve.

A diagram of an aging system 100 incorporating controlled decompression is illustrated in FIG. 9. As shown, system 100 includes a pressure vessel 110 which may hold one or more gas lift valves (not shown). A pressure transducer 112 monitors interior pressure of the pressure vessel 110. Outputs of the pressure transducer are received by a controller 120 that is operative to utilize the pressure transducer information to open and close various valves of the system. As illustrated in the presented embodiment, the controller 120 operates a water pump 122 to initially pressurized the pressure vessel 110. The controller is connected to a solenoid 124 that operates the pump 122, which is connected to an inlet of the vessel. The solenoid 124 is connected to a source pressurized air. However, it will be appreciated that in other embodiments other actuators or solenoids (e.g., electronic) may be utilized. The pump 122 provides fluid/water to the pressure vessel via needle valve 126 that is also operated by an air actuated solenoid 128 operated by the controller 120. A pressure relief valve 130 may be incorporated into the system for safety. To provide controlled release of small volumes of water from the pressure vessel 110 to allow for small incremental pressure decreases, the system 100 utilizes a throttling valve 132 connected to an outlet of the pressure vessel 110. The throttling valve reduces the rate of the fluid flowing from the pressure vessel 110. To further control the release of fluid from the pressure vessel, a needle valve 134 is located downstream of the throttling valve. The downstream needle valve also be operated by the controller via a solenoid 136. The utilization of the two downstream valves allows for controlling the release of small volumes of fluid from the pressure vessel thereby permitting the controlled decompression of the vessel.

The controller 120 stores information (e.g., in memory) regarding different types of materials utilized to form the O-rings or other seals. Such information may be tabulated to predetermined decompression rates. Further, the controller may include user inputs (e.g., keyboards, touch screens etc.) and output (e.g., monitors). In an embodiment, the controller permits fully automated operation after a user provides initial information. Such information may include, without limitation, the initial vessel pressure, the initial holding time, number of aging cycles and/or O-ring material. The controller may then operate the system free of additional user interaction.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A system for aging gas lift valves, comprising:
   a pressure vessel configured to hold one or more gas lift valves within an interior space;
   a pressure transducer connected to the pressure vessel configured to generate an output indicative of a pressure within the interior space of the pressure vessel;
   a pump fluidly connected to an inlet of the pressure vessel;
   a first downstream valve connected to an outlet of the pressure vessel;
   a first actuator connected to the first downstream valve configured to open and close the first downstream valve; and
   a controller operatively connected to the pump, pressure transducer and the first actuator, the controller operative to:
   pressurize the pressure vessel to a predetermined pressure using the pump and outputs from the pressure transducer; and
   incrementally reduce the pressure in the interior space of the pressure vessel in a series of pressure reduction steps that are each maintained for a predetermined time, wherein the predetermined time is at least 15 seconds.

2. The system of claim 1, wherein the controller operates the first actuator to open and close the first downstream valve based on output from the pressure transducer to incrementally reduce the pressure in the pressure vessel.

3. The system of claim 1, further comprising:
   an upstream valve disposed between the pump and the pressure vessel, wherein the upstream valve is controlled by an actuator operatively connected to the controller.

4. The system of claim 1, further comprising:
   a second downstream valve disposed in-line with and upstream of the first downstream valve between the first downstream valve and the outlet of the pressure vessel, the second downstream valve being a throttling valve configured to reduce a rate of fluid flowing from the pressure vessel and the first downstream valve being a needle valve.

5. The system of claim 1, wherein the controller further comprises stored information relating to seal materials utilized in gas lift valves, wherein the controller incrementally reduces pressure in the pressure vessel based on a user selected seal material.

6. The system of claim 1, wherein the controller is configured to maintain the interior space at the predetermined pressure for at least about 5 minutes prior to performing the step of incrementally reducing the pressure in the interior space of the pressure vessel.

7. The system of claim 1, wherein the predetermined time is selected from the range of 15 to 90 seconds.

8. The system of claim 7, wherein the predetermined time is at least 30 seconds and is selected automatically by the controller based on user input defining a seal material for one or more seals in the one or more gas lift valves.

9. The system of claim 1, wherein each of the pressure reduction steps reduces the pressure in the interior space by a pressure reduction in the range of 125 to 500 psig.

10. The system of claim 9, wherein the pressure reduction is selected automatically by the controller based on user input defining a seal material for one or more seals in the one or more gas lift valves.

11. The system of claim 9, wherein the pressure reduction is at least about 250 psig.

12. A process for aging gas lift valves, comprising:
    pressurizing a pressure vessel to a predetermined pressure, the pressure vessel having one or more gas lift valves within an interior space;
    reducing the pressure within the interior space of the pressure vessel a predetermined pressure increment to a reduced pressure;
    holding the reduced pressure for a predetermined time period selected from the range of 15 to 90 seconds; and
    repeating the reducing and holding steps until a pressure within the pressure vessel is at or below a predetermined minimum pressure.

13. The process of claim 12, further comprising:
    repressurizing the pressure vessel to the predetermined pressure and repeating the reducing, holding and repeating steps.

14. The process of claim 12, wherein the predetermined pressure increment and/or the predetermined time period are selected based on seal materials of the gas lift valves.

15. The process of claim 12, wherein the predetermined time is at least 30 seconds and is selected automatically by a controller based on received user input defining a seal material for one or more seals in the one or more gas lift valves.

16. The process of claim 12, wherein the step of reducing the pressure within the interior space of the pressure vessel is performed after the predetermined pressure is maintained for at least about 5 minutes.

17. The process of claim 12, wherein reducing the pressure and holding the pressure comprises:
   monitoring a pressure in the vessel with a pressure transducer; and
   operating at least a first valve connected to an outlet of the tank.

18. The process of claim 17, wherein a controller operatively connected to the pressure transducer and the valve controls the valve based on outputs from the pressure transducer.

19. The process of claim 12, wherein the predetermined pressure increment is in the range of 125 to 500 psig.

20. The process of claim 19, wherein the predetermined pressure increment is at least about 250 psig.

* * * * *